US012809616B2

(12) United States Patent
Sidhardhan et al.

(10) Patent No.: US 12,809,616 B2
(45) Date of Patent: Nov. 24, 2026

(54) DYNAMIC FIRMWARE UPDATE FOR SINGLE CHIP RADIO IN INTERNET OF THINGS ENVIRONMENT

(71) Applicant: Samsung Electronics Co., Ltd., Suwon-si (KR)

(72) Inventors: Syam Sidhardhan, Bengaluru (IN); Siba Prasad Samal, Bengaluru (IN); Anurag Biradar, Bengaluru (IN); Inpyo Kang, Suwon-si (KR); Dongwook Lee, Suwon-si (KR); Niranjan B Patil, Bengaluru (IN); Ankit Jain, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 18/636,567

(22) Filed: Apr. 16, 2024

(65) Prior Publication Data

US 2024/0256265 A1 Aug. 1, 2024

Related U.S. Application Data

(63) Continuation of application No. PCT/IB2024/050651, filed on Jan. 24, 2024.

(30) Foreign Application Priority Data

Jan. 24, 2023 (IN) ............................ 202341004753
Dec. 20, 2023 (IN) ............................ 202341004753

(51) Int. Cl.
*G06F 8/654* (2018.01)

(52) U.S. Cl.
CPC .................................. *G06F 8/654* (2018.02)

(58) Field of Classification Search
None
See application file for complete search history.

(56) References Cited

U.S. PATENT DOCUMENTS 7,293,169 B1 * 11/2007 Righi ...................... G06F 8/656 717/171
8,694,824 B2 4/2014 Howard et al.
(Continued)

FOREIGN PATENT DOCUMENTS

CN 111580840 A 8/2020
CN 112291323 A 1/2021
(Continued)

OTHER PUBLICATIONS

XP 011729508, Secure Firmware Updates for Constrained loT Devices Using Open Standards: A Reality Check, May 29, 2019.
(Continued)

*Primary Examiner* — Qing Chen
(74) *Attorney, Agent, or Firm* — Jefferson IP Law, LLP

(57) ABSTRACT

Methods and systems for dynamically updating firmware of a single-protocol based one-chip radio device present in an Internet of things (IoT) environment with multiple technologies using an intelligent firmware update based on size of the flash memory, the one or more hardware resources available at the controller level, and a current IoT context associated with the IoT environment are provided. The method includes receiving a firmware update package, determining a size of flash memory and one or more hardware resources at a controller level of the single-protocol, based on receiving the firmware update package, correlating the received firmware update package with the size of the flash memory, dynamically selecting one or more firmware resources from the received firmware package for updating firmware of the single-protocol based one-chip radio device based on the
(Continued)

correlation, and updating firmware of the single-protocol based one-chip radio device using the one or more firmware resources.

20 Claims, 10 Drawing Sheets

(56) References Cited

U.S. PATENT DOCUMENTS

| | | | | |
|---|---|---|---|---|
| 10,387,257 | B1 | 8/2019 | Brown et al. | |
| 10,904,086 | B1 | 1/2021 | Varia et al. | |
| 10,958,782 | B2 | 3/2021 | Tran et al. | |
| 12,001,834 | B2 | 6/2024 | Hong et al. | |
| 2007/0245333 | A1* | 10/2007 | Ferlitsch | G06F 8/65 717/168 |
| 2009/0299884 | A1 | 12/2009 | Chandra | |
| 2014/0007069 | A1* | 1/2014 | Cavalaris | G06F 8/654 717/170 |
| 2016/0117165 | A1* | 4/2016 | Cavalaris | G06F 8/65 717/169 |
| 2016/0371074 | A1* | 12/2016 | Vyas | H04W 4/60 |
| 2017/0295503 | A1 | 10/2017 | Govindaraju et al. | |
| 2019/0138295 | A1* | 5/2019 | Agerstam | H04L 45/02 |
| 2020/0379749 | A1 | 12/2020 | Zhu | |
| 2022/0374221 | A1* | 11/2022 | Sayyed | G06F 21/572 |
| 2023/0112734 | A1* | 4/2023 | Suryanarayana | H04L 9/3247 717/170 |
| 2023/0127992 | A1* | 4/2023 | Samuel | G06F 8/654 717/168 |
| 2023/0350669 | A1 | 11/2023 | Lim et al. | |

FOREIGN PATENT DOCUMENTS

| | | | |
|---|---|---|---|
| CN | 114416154 | A | 4/2022 |
| CN | 116017792 | A | 4/2023 |
| KR | 10-2730701 | B1 | 11/2024 |
| WO | 2022-080539 | A1 | 4/2022 |

OTHER PUBLICATIONS

Extended European Search Report dated Nov. 24, 2025, issued in a European Application No. 24747025.5.

Samsung SmartThings Integrates Matter Into Ecosystem, Bringing Matter Device Control to Multiple Samsung Products, Oct. 27, 2021. https://news.samsung.com/global/samsung-smartthings-integrates-matter-into-ecosystem-bringing-matter-device-control-to-multiple-samsung-products.

Samsung SmartThings is now Matter certified, 2022. https://www.theverge.com/2022/10/13/23400462/samsung-smartthings-matter-upgrade-hubs.

International Search Report dated Apr. 18, 2024, issued in International Application No. PCT/IB2024/050651.

Indian Office Action dated Jul. 17, 2026, issued in a Indian Patent Application No. 202341004753.

* cited by examiner

DYNAMIC FIRMWARE UPDATE FOR SINGLE CHIP RADIO IN INTERNET OF THINGS ENVIRONMENT

CROSS-REFERENCE TO RELATED APPLICATION(S)

This application is a continuation application, claiming priority under § 365(c), of an International application No. PCT/IB2024/050651, filed on Jan. 24, 2024, which is based on and claims the benefit of an Indian Provisional patent application number 202341004753, filed on Jan. 24, 2023, in the Indian Patent Office, and of an Indian Complete patent application number 202341004753, filed on Dec. 20, 2023, in the Indian Patent Office, the disclosure of each of which is incorporated by reference herein in its entirety.

TECHNICAL FIELD

The disclosure relates to wireless communication technologies. More particularly, the disclosure relates to enabling multiple wireless communication technologies to be used in a device using a single chip radio.

BACKGROUND ART

In an Internet of things (IoT) environment, there may be devices which run different protocols for communication. In an example herein, the IoT environment may comprise of a first device using Bluetooth for communication and a second device using Thread for communication, wherein a hub device can communicate with the first and second devices using a single chip radio with their respective communication protocols. However, if a third device with ZigBee (which the hub device is not equipped with) joins the IoT environment, the hub device is not able to communicate with the third device, without upgrading the single chip radio.

Currently, multiple technologies run on a single combo chipset with separate radios. But, there is no methods and systems to use single chip radio to facilitate multiple communication technologies. This leads to resource wastage (e.g., hardware resource wastage or the like) and increasing cost for the separate radios. Further, the existing methods and systems are unable to migrate the existing market device(s) to use the new technology. In an example, an existing IoT hub cannot be upgraded to support thread technology to support upcoming technologies.

Current solutions enable multiple IoT protocols to run on a single chip by using a software module, but does not disclose how to dynamically update firmware with multiple technologies for devices currently in use in an IoT environment. There are solutions, which require distribution of a physical storage device to users, which can require huge manufacturing, marketing and distribution efforts and costs.

The above information is presented as background information only to assist with an understanding of the disclosure. No determination has been made, and no assertion is made, as to whether any of the above might be applicable as prior art with regard to the disclosure.

SUMMARY

Technical Problem

Aspects of the disclosure are to address at least the above-mentioned problems and/or disadvantages and to provide at least the advantages described below. Accordingly, an aspect of the disclosure is to provide methods and systems for dynamically updating firmware of a single-protocol based one-chip radio device present in an Internet of things (IoT) environment with multiple technologies using an intelligent firmware update based on size of flash memory, the one or more hardware resources available at a controller level, and a current IoT Context associated with the IoT environment.

Additional aspects will be set forth in part in the description which follows and, in part, will be apparent from the description, or may be learned by practice of the presented embodiments.

Technical Solution

In accordance with an aspect of the disclosure, a method for dynamically updating firmware of a single-protocol based one-chip radio device present in an IoT environment is provided. The method includes receiving a firmware update package, wherein the firmware update package includes one or more firmware resources associated with one or more connectivity protocols, determining a size of flash memory and one or more hardware resources at a controller level of the single-protocol based one-chip radio device, based on receiving the firmware update package, correlating the received firmware update package with the size of the flash memory, the one or more hardware resources available at the controller level, and a current IoT context associated with the IoT environment, dynamically selecting one or more firmware resources from the received firmware package for updating firmware of the single-protocol based one-chip radio device based on the correlation, and updating firmware of the single-protocol based one-chip radio device using the dynamically selected one or more firmware resources.

The dynamically selecting the one or more firmware resources is based on at least one of hardware/radio availability, usage of devices in the IoT environment and location and behavior of the devices in the IoT environment, geo-location of the single-protocol based one-chip radio device, application load on the single-protocol based one-chip radio device, firmware resources, priority of the devices in the IoT environment, user preference, or user selection.

The method further includes creating space for the firmware update package using network co-processor (NCP) to radio co-processor (RCP).

The method further includes taking a backup of one or more devices connected to the single-protocol based one-chip radio device.

The updating the single-protocol based one-chip radio device with multiple protocols further includes restoring connectivity of the one or more devices previously connected to the single-protocol based one-chip radio device prior to the updating, using the backup.

The method further includes dropping one or more firmware resources from the selected one or more firmware resources, based on a failure occurring according to the updating the firmware of the single-protocol based one-chip radio device.

The one or more connectivity protocols includes at least one of Zigbee, Thread, or Bluetooth low energy (BLE).

The one or more hardware resources includes radio, channel range, network co-processor/radio co-processor (NCP/RCP) at the controller level of the single-protocol based one-chip radio device.

The method further includes flashing the selected one or more firmware resources into the flash memory.

The selected one or more firmware resources is a first resource information. The method further includes based on failure of the flashing being detected, recalculating one or more blocks present in the firmware update package, obtaining a second resource information by dropping one or more firmware resources from the selected one or more firmware resources, re-flashing the second resource information into the flash memory, and updating the firmware of the single-protocol based one-chip radio device using the second resource information.

In accordance with another aspect of the disclosure, a single-protocol based one-chip radio device present in an IoT environment is provided. The single-protocol based one-chip radio device includes memory, a firmware control module coupled with the memory, and one or more processors configured to be electrically connected to the firmware control module and the memory. The memory store one or more computer programs including computer-executable instructions that, when executed by the one or more processors, cause the single-protocol based one-chip radio device to receive a firmware update package, wherein the firmware update package includes one or more firmware resources associated with one or more connectivity protocols, determine a size of flash memory and one or more hardware resources at a controller level of the single-protocol based one-chip radio device, based on receiving the firmware update package, correlate the received firmware update package with the size of the flash memory, the one or more hardware resources available at the controller level, and a current IoT context associated with the IoT environment, dynamically select one or more firmware resources from the received firmware package for updating firmware of the single-protocol based one-chip radio device based on the correlation, and update firmware of the single-protocol based one-chip radio device using the dynamically selected one or more firmware resources.

The one or more computer programs further comprise computer-executable instructions that, when executed by the one or more processors, cause the single-protocol based one-chip radio device to dynamically select one or more firmware resources based on at least one of hardware/radio availability, usage of devices in the IoT environment and location and behavior of the devices in the IoT environment, geo-location of the single-protocol based one-chip radio device, application load on the single-protocol based one-chip radio device, firmware resources, priority of the devices in the IoT environment, user preference, or user selection.

The one or more computer programs further comprise computer-executable instructions that, when executed by the one or more processors, cause the single-protocol based one-chip radio device to create space for the firmware update package using network co-processor (NCP) to radio co-processor (RCP).

The one or more computer programs further comprise computer-executable instructions that, when executed by the one or more processors, cause the single-protocol based one-chip radio device to take a backup of one or more devices connected to the single-protocol based one-chip radio device.

The one or more computer programs further comprise computer-executable instructions that, when executed by the one or more processors, cause the single-protocol based one-chip radio device to restore connectivity of one or more devices previously connected to the single-protocol based one-chip radio device prior to the updating.

One or more non-transitory computer-readable storage media storing computer-executable instructions that, when executed by one or more processors of a single-protocol based one-chip radio device, cause the single-protocol based one-chip radio device to perform operations are provided. The operations include receiving a firmware update package, wherein the firmware update package includes one or more firmware resources associated with one or more connectivity protocols, determining a size of flash memory and one or more hardware resources at a controller level of the single-protocol based one-chip radio device, based on receiving the firmware update package, correlating the received firmware update package with the size of the flash memory, the one or more hardware resources available at the controller level, and a current IoT context associated with the IoT environment, dynamically selecting one or more firmware resources from the received firmware package for updating firmware of the single-protocol based one-chip radio device based on the correlation, and updating firmware of the single-protocol based one-chip radio device using the dynamically selected one or more firmware resources.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
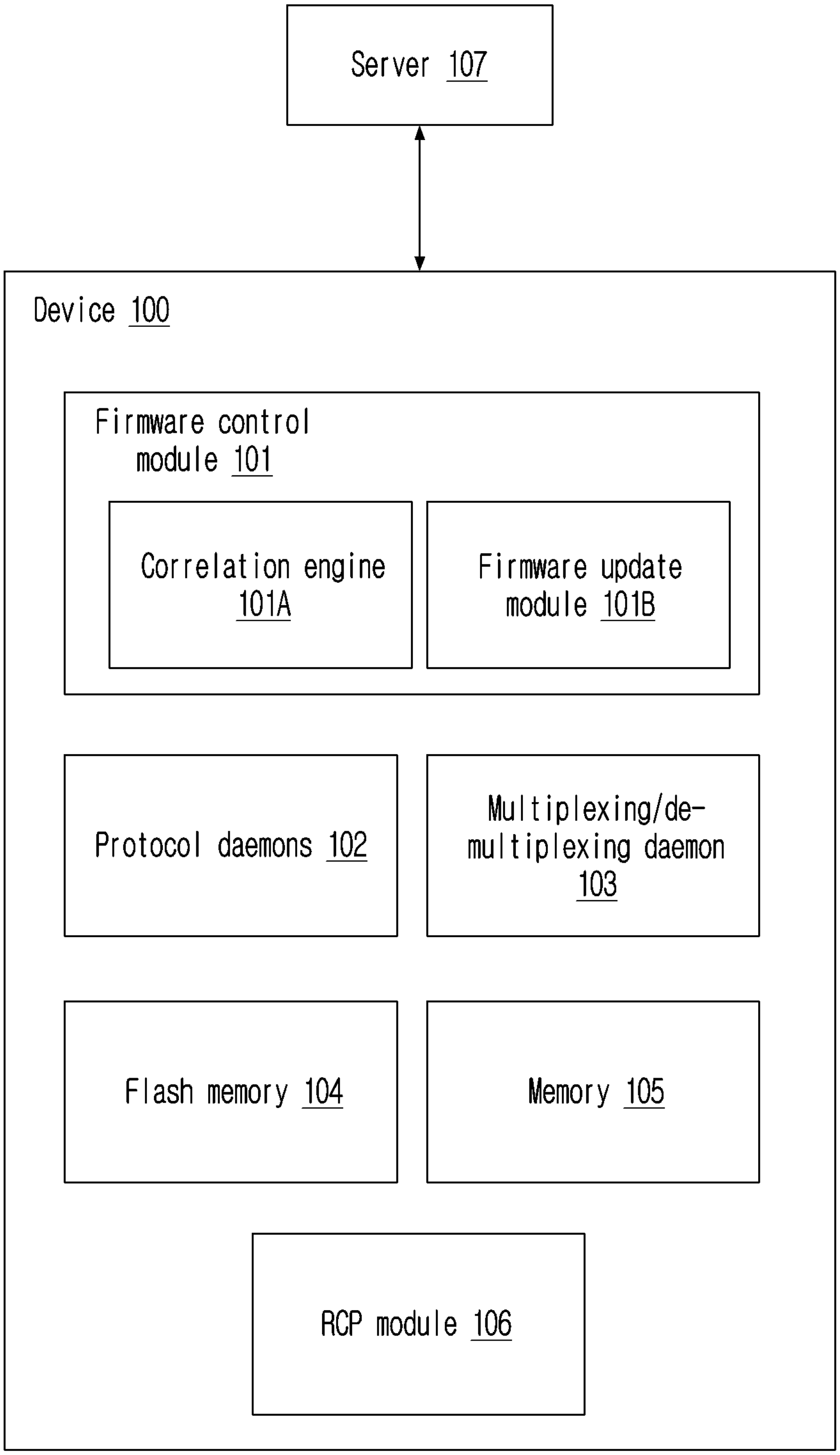
FIG. 1 depicts a device comprising a firmware controller for dynamically updating firmware of the device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the purposes of interpreting this specification, the definitions (as defined herein) will apply and whenever appropriate the terms used in singular will also include the plural and vice versa. It is to be understood that the terminology used herein is for the purposes of describing particular embodiments only and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to mean "serving as an example, instance, or illustration." Any embodiment or implementation of the subject matter described herein using the words/phrases "exemplary", "example", "illustration", "in an instance", "and the like", "and so on", "etc.", "etcetera", "e.g.,", "i.e.," is not necessarily to be construed as preferred or advantageous over other embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the disclosure should be construed to extend to any modifications, equivalents, and substitutes in addition to those which are particularly set out in the accompanying drawings and the corresponding description. Usage of words, such as first, second, third, or the like, to describe components/elements/steps is for the purposes of this description and should not be construed as sequential ordering/placement/occurrence unless specified otherwise.

The embodiments herein achieve methods and systems for dynamically updating firmware of a single-protocol based one-chip radio device present in an Internet of things (IoT) environment with multiple technologies using an intelligent firmware update. Referring now to the drawings, and more particularly to FIGS. 1 to 4, 5A to 5C, 6A, 6B, and 7, where similar reference characters denote corresponding features consistently throughout the figures, there are shown embodiments.

Embodiments herein disclose methods and systems for dynamically updating firmware of a single-protocol based one-chip radio device present in an IoT environment with multiple technologies using an intelligent firmware update based on size of the flash memory, the one or more hardware resources available at the controller level, and a current IoT Context associated with the IoT environment. The device as referred to herein can be any device present in the IoT environment, which is capable of communicating with one or more other devices using multiple communication technologies. In an example scenario, consider that a user has previously purchased a smart home hub device and there are new technologies available (which is not present in the hub device). Embodiments herein will enable the user to upgrade the existing hub device without adding additional hardware chip(s).

Embodiments herein disclose a method for dynamically updating firmware of a single-protocol based one-chip radio device (e.g. smart home hub) present in an IoT environment. The method incudes receiving a firmware update package by the single protocol based one-chip radio device, wherein the update package includes one or more firmware resources associated with one or more connectivity protocols (for example, Zigbee, Thread, Bluetooth Low Energy (BLE), Wi-Fi, wireless local area network (WLAN) (slim version), Z-wave, Ultra Wide Band (UWB), and so on). In response to receiving the firmware update package, the method further determines determining a size of flash memory and one or more hardware resources available (such as, but not limited to, radio, channel range, network co-processor/radio co-processor (NCP/RCP) at a controller level of the single-protocol based one-chip radio device. The method further correlates the received firmware update package with the size of the flash memory, the one or more hardware resources available at the controller level, and a current IoT Context associated with the IoT environment; and dynamically selecting one or more firmware resources from the received firmware package for updating firmware of the single-protocol based one-chip radio device based on the correlation.

Embodiments herein can dynamically update (flash) the single-protocol based one-chip radio device with multiple protocols, wherein the updated firmware comprises the selected one or more firmware resources and the selected one or more firmware resources have been selected based on a current user context.

The firmware resources may relate to a set of rules for communication between one or more devices. The firmware resources may include necessary components to implement and execute a specific protocol.

The firmware resources may include a code, libraries, configurations, and data necessary to implement and execute specific protocol.

The firmware resources may include at least one of read only memory (ROM) size, signing information, channel number, bootloader, or priority.

Embodiments herein can further restore connectivity of one or more devices previously connected to the single-protocol based one-chip radio device prior to the updating.

Based on the correlation among technology(ies) available on other devices at a location, embodiments herein can dynamically decide whether to support technology(ies) to support the distributed hardware present in the location.

Embodiments herein use the terms 'technology', and 'protocol' interchangeably to refer to communication technologies that may be used by the device (as referred to herein) for communications.

The hub device as referred to herein can be a device and/or an application that can connect to one or more other devices present in the IoT environment. The hub device can communicate and/or control the one or more other devices present in the IoT environment.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 depicts a device comprising a firmware controller for dynamically updating firmware of the device according to an embodiment of the disclosure.

Referring to FIG. 1, a device 100 can be a single-protocol based one-chip radio device present in an IoT environment. The IoT environment can be one of a consumer IoT environment or an industrial IoT. In an example herein, the consumer IoT environment can comprise one or more portable devices (such as a smart phone, a wearable device, and so on). In an example herein, the consumer IoT environment can comprise one or more home devices (such as an appliance, a home automation system, a home surveillance system, and so on). In an example herein, the industrial IoT environment can be a small industry environment, which can comprise one or more heavy machines, transportation modes, smart cities, and so on. In an example herein, the industrial IoT environment can be a big industry environment, which can comprise one or more components/machines used in automation, one or more components/machines used in factories, one or more components/machines/devices used in healthcare, and so on.

The device 100 as depicted comprises a firmware control module 101, a plurality of protocol daemons 102, a multiplexing/de-multiplexing daemon 103, flash memory 104, memory 105, and an RCP module 106. In an embodiment herein, the RCP module 106 can be a 802.15.4 module (chip). In an embodiment herein, the RCP module 106 can be connected to a single antenna (Tx/Rx). The daemons 102, 103 can perform muxing and de-muxing operations on data that is transmitted and received respectively. The device 100 can be connected to a server 107, which can be connected to the device 100 using a wireless communication protocol (such as, but not limited to, wi-fi, cellular, and so on).

The firmware control module 101 may be described as at least one of processors or controller.

Figure 4:
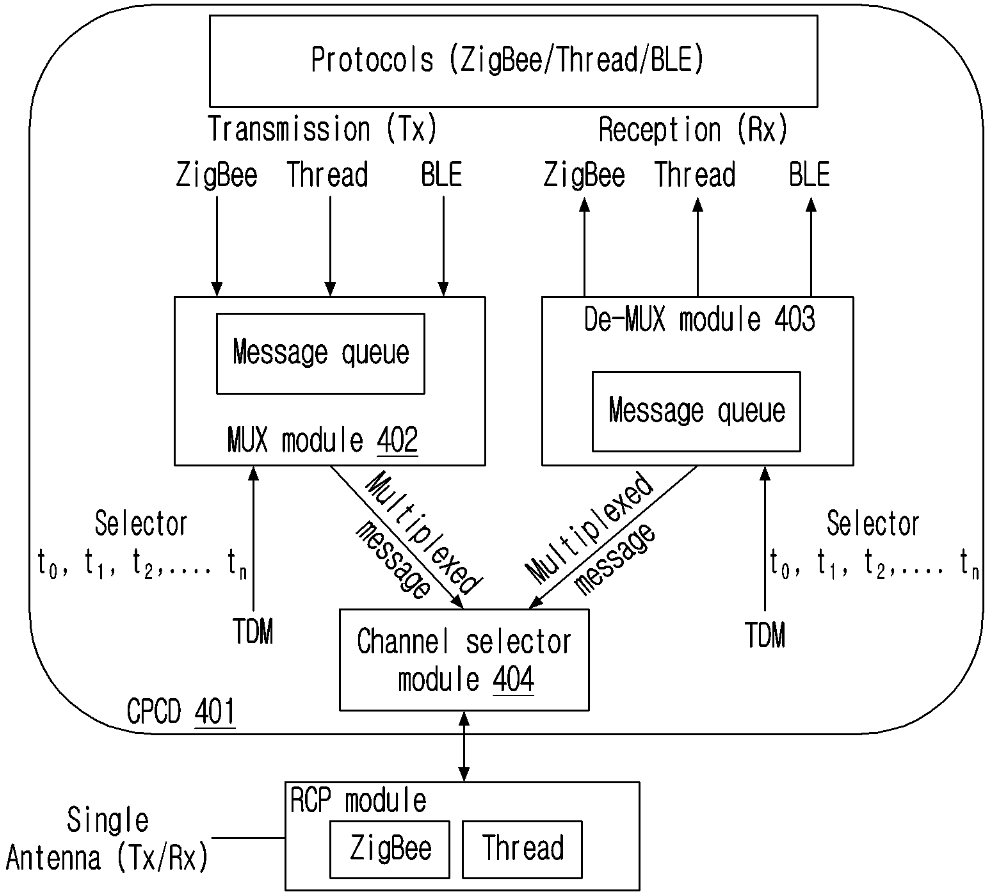
FIG. 4 depicts a scenario, where information is processed in a device by a co-processor daemon (CPCD) according to an embodiment of the disclosure.

The protocol daemons 102 are corresponding to the software stack of the technologies which are being supported, for example, Zigbee daemons, Thread daemons, Bluetooth daemons, and so on, which are for supporting the underlying technologies. Multiplexing/demultiplexing modules/daemons (which are referred to herein as CPCD daemons) which are to be serialized and reserialized, the multiple communication technologies over a single universal asynchronous receiver/transmitter (UART) communication, as depicted in FIG. 4. The protocol daemons 102 can be a program that is run as a background process. The protocol daemons 102 can wake up to handle requests received from external programs/applications/devices or internal programs/applications.

The server 107 can determine communication protocols that are supported by the device 100 (i.e., supported by the RCP module 106). Examples of the communication protocols that are supported by the RCP module 106 can be, but not limited to, Zigbee, Thread, Bluetooth, BLE, LoRa, UWB, matter compatible protocols/technologies, and so on. This can involve the server 107 determining the metadata for each of the supported communication protocols, wherein the metadata comprises at least one of, but not limited to, read only memory (ROM) size, signing information, channel number, bootloader, priority, and so on. Tables 1 and 2 are examples depicting the supported communication protocols and the respective metadata respectively.

TABLE 1

| Metadata | Zigbee (110 KB) | Thread (230 KB) | BLE (50 KB) | UWB (170 KB) | LoRa (110 KB) |
|---|---|---|---|---|---|

TABLE 2

| Technology | ROM (KB) | CRC Signing | Block Address | Channel Number | Boot Loader | Priority |
|---|---|---|---|---|---|---|
| Zigbee | 110 KB | 0xAD124FB1 | 0x117732 | 11 | Yes | 1 |
| Thread | 203 KB | 0xF3D12A32 | 0x1286AF | 11 | No | 2 |
| BLE | 50 KB | 0x165F234A | 0x148ACD | 3 | Yes | 3 |
| UWB | 170 KB | 0x76A5CD21 | 0x2483FA | 13 | No | 4 |
| LoRa | 110 KB | 0x43A2C787 | 0x36AD23 | 3 | No | 5 |

The server 107 can prepare a master firmware image, wherein the master firmware image comprises the firmware resources of the communication protocols, and the metadata. In an embodiment herein, the firmware resources may include the metadata. In an embodiment herein, the server 107 can store the master firmware image in a suitable location (such as, but not limited to, a data server, the server 107, the Cloud, and so on). In an embodiment herein, the server 107 can communicate the master firmware image to the device 100.

Consider that the firmware control module 101 receives the master firmware package from the server 107.

Figure 2:
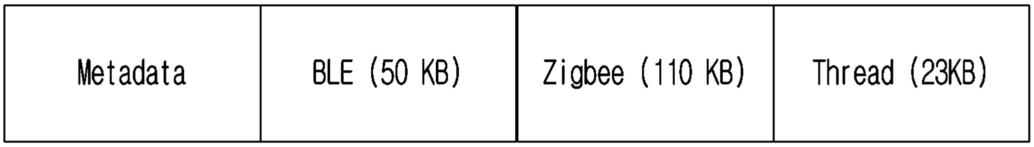
FIG. 2 depicts a master firmware package according to an embodiment of the disclosure.

FIG. 2 and Table 3 depict contents of a master firmware package with a plurality of protocol connectivity resources according to an embodiment of the disclosure.

Referring to FIG. 2 and Table 3, the master firmware package comprises firmware for BLE, ZigBee, Thread, and so on. The firmware control module 101 can store the received master firmware package in a suitable location, such as in the memory 105.

TABLE 3

| Metadata | BLE (50 KB) | Zigbee (110 KB) | Thread (230 KB) |
|---|---|---|---|

The firmware control module 101 can determine the hardware resources present in the device 100 and currently available in the device 100. The firmware control module 101 can determine the hardware resources by fetching the hardware resources from the memory 105 and/or the flash memory 104. Examples of the hardware resources can be, but not limited to, size of the flash memory 104, one or more hardware resources available at a controller level of the device 100, the firmware (i.e., an image) that has been currently flashed (i.e., present in the flash memory 104), and so on. Table 4 is an example table depicting an example of the one or more hardware resources available at a controller level of the device 100. Table 5 is an example table depicting the firmware that has been currently flashed (i.e., Zigbee in the current example).

TABLE 4

| Total Flash | Flash utilized | Free Memory | Channel range | Bootloader | NCP/RCP | Priority |
|---|---|---|---|---|---|---|
| 512 KB | 220 KB | 292 KB | 1-16 | Yes | NCP | 1 |

TABLE 5

| Technology | ROM (KB) | CRC Signing | Block Address | Channel Number | Boot Loader | Priority |
|---|---|---|---|---|---|---|
| Zigbee | 110 KB | 0xAD124FB1 | 0x117732 | 11 | Yes | 1 |

The firmware control module 101 can further comprise a correlation engine 101A. The correlation engine 101A can determine a correlation between a plurality of factors and using the determined correlation, the correlation engine 101A can determine a firmware update package for the device 100 (as depicted in FIG. 3).

Figure 3:
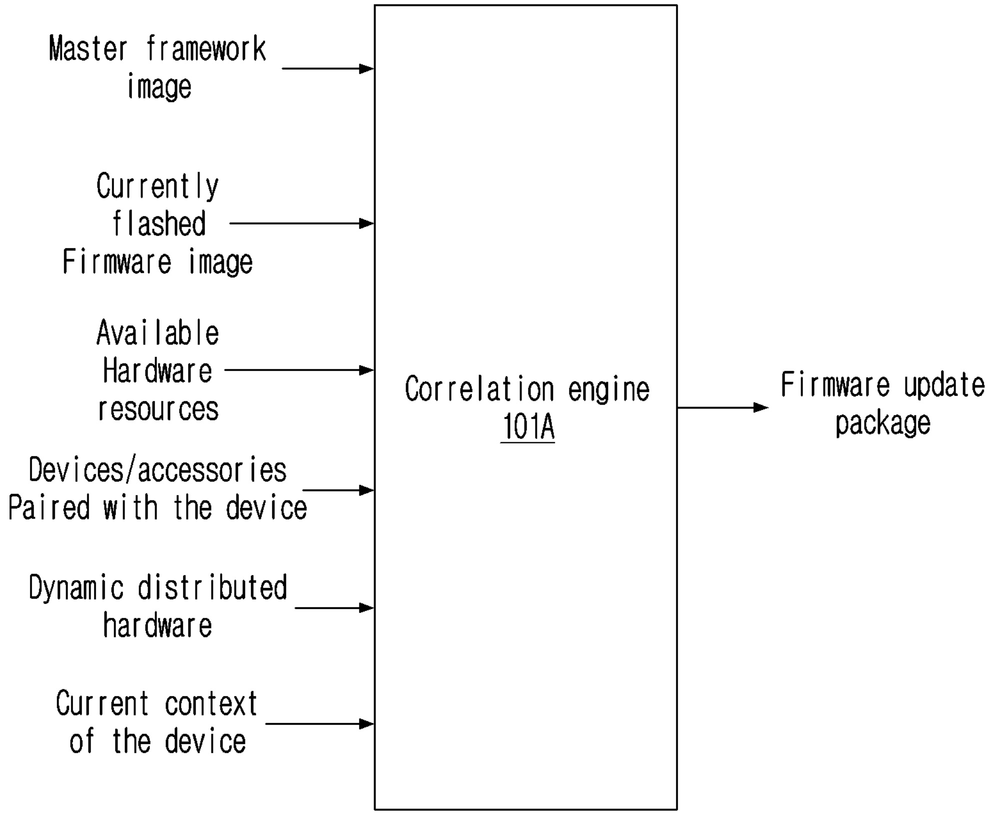
FIG. 3 depicts a correlation engine determining a firmware update package for a device according to an embodiment of the disclosure.

FIG. 3 depicts a correlation engine determining a firmware update package for a device according to an embodiment of the disclosure.

Referring to FIG. 3, the plurality of factors can comprise the received master framework image (as depicted in the example in Table 3), the firmware image that is currently flashed on the flash memory 104 (as depicted in the example in Table 5), the hardware resources available on the device 100 (as depicted in the example in Table 4), a previous feedback status (as depicted in the example in Table 6), a list of devices/accessories paired with the device 100 (as depicted in the example in Table 7), dynamic distributed hardware, and a current context of the device 100 (such as, but not limited to, the location of the device 100 (at home/at office/in transit/in a vehicle), and so on), device behavior, device resources, and so on). The determined firmware update package can comprise the firmware(s) that is to be flashed into the flash memory 104 based on the plurality of factors and one or more related resources. In the example herein, the determined firmware update package can comprise of ZigBee, Thread and a plurality of related resources.

In an example scenario, a home can have multiple hubs; for example, hub 1, hub 2 and hub 3, and so on.

Hub 1: (has) Zigbee

Hub 2: (has) Zigbee, BLE

Hub 3: (has) Zigbee, BLE

Consider that a user purchases an additional new hub (a television (TV) in the current example, which supports Thread). Based on capabilities of nearby existing hubs (i.e., hub 1, hub 2, and hub 3), the device 100 can be dynamically updated with Thread protocol, so that the home environment can support Thread technology as well.

Device behavior means the protocols that are being used by a hub at specific times and/or locations. In an example, consider that hub 1 is to have ZigBee and Thread from 6 AM-10 PM, and the hub 1 is updated with BLE+ Thread for the remaining time. Based on this behavior observation, embodiments herein can determine at what time and location which protocol needs to be supported and can accordingly, update the firmware of the hub.

In an example herein, the correlation engine 101A can receive inputs, such as, but not limited to, current location, RSSI of the devices, link quality of the devices, and so on. Theoretically, any parameters can be the input to the correlation engine 101A.

In an example scenario, the correlation engine 101A can dynamically select the firmware package based on the available flash resources, the received master framework image, the current hub (i.e., a device to which the device 100 is currently connected) & protocols supported in the vicinity of the device 100 (such as in nearby rooms, within the vehicle, in the office, and so on).

In an example scenario, the correlation engine 101A can dynamically select the firmware package based on the application computer processing unit (CPU) load.

In an example scenario, consider that the device 100 is a portable hub. The correlation engine 101A can dynamically select the firmware package based on the user's devices, while in the user in office/home/transit, and so on.

In an example scenario, the correlation engine 101A can dynamically select the firmware package and change the behavior and distance between the device 100 and a hub, based on the current time.

TABLE 6

| Devices | Status | Channel |
|---|---|---|
| Zigbee | Ok | 11 |
| Thread | Ok | 11 |
| BLE | NOK | 3 |

TABLE 7

| Devices | Status |
|---|---|
| BT Headset | Ok |
| Watch | Ok |
| BLE | NOK |

The firmware control module 101 can further comprise a firmware update module 101B (as depicted in FIG. 1). The correlation engine 101A can provide the firmware update module 101B with the determined firmware update package. The firmware update module 101B can initiate flashing the flash memory 104 using the determined firmware update package; i.e., the firmware update module 101B can dynamically update the device 100 to support multiple protocols using the determined firmware update package based on the correlation.

In an embodiment herein, the firmware update module 101B can take a backup of the image that is currently flashed on the flash memory 104 to the memory 105, before initiating the flashing of the flash memory 104. In an embodiment herein, the firmware update module 101B can take a backup of other devices connected to the device 100 to the memory 105, before initiating the flashing of the flash memory 104.

In the example herein, the firmware update module 101B can flash the flash memory 104 with the determined firmware update package, which can comprise of ZigBee, Thread and the plurality of resources. The process of flashing the flash memory 104 can comprise the firmware update module 101B creating space for the firmware update package using network co-processor (NCP) to radio co-processor (RCP).

On successfully flashing the flash memory 104, the firmware update module 101B can restore connectivity of other devices that were previously connected to the device 100, using the previously taken backup from the memory 105.

Consider a scenario, where the flashing process fails (which can be due to reasons, such as, but not limited to, flash limitation, and so on), the firmware update module 101B can recalculate one or more blocks present in the firmware update package and/or drop one or more firmware resources from the selected one or more firmware resources, and attempt to flash the flash memory 104 again. On a firmware flash failure being detected, the correlation engine 101A can prepare the new optimal firmware, based on the previous the determined firmware update package, and the failure reason. In an embodiment herein, the firmware update module 101B can recalculate one or more blocks present in the firmware update package by dropping lower priority blocks from the firmware update package.

FIG. 4 depicts a scenario, where information is processed in a device by a co-processor daemon (CPCD) according to an embodiment of the disclosure.

Referring to FIG. 4, a CPCD 401 comprises a mux module 402, a de-mux module 403, and a channel selector module 404. The channel selector module 404 can select a particular channel based on supported channel list pool, wherein the selected channel is the communication frequency band reserved for communication.

A mux module 402 can be used in the Tx side, wherein the mux module 402 can serialize the various technologies based on time division multiplexing (TDM). The mux module 402 can comprise a message queue interface, wherein the message queue interface can enable syncing between a fast transmitter and a slow remote receiver. This helps to queue the packets. Once the message queue is full, the mux module 402 can provide a quality of service (QoS) indication to the respective application (such as, but not limited to, ZigBee, Thread, BLE, and so on) to stop sending packets.

A de-mux module 403 can be used in the Rx side for de-multiplexing. The de-mux module 403 can decode the packets based on the respective headers. The de-mux module 403 can then deliver the decoded packets to the corresponding application stack (such as, but not limited to, ZigBee, Thread, BLE, and so on). The de-mux module 403 can comprise a message queue interface, wherein the message queue interface can enable syncing between a fast transmitter and a slow remote receiver. This helps to queue the packets. Once the message queue is full, the de-mux module 403 can provide a quality of service (QoS) indication to the respective application (such as, but not limited to, ZigBee, Thread, BLE, and so on) to stop sending packets.

Figure 5A:
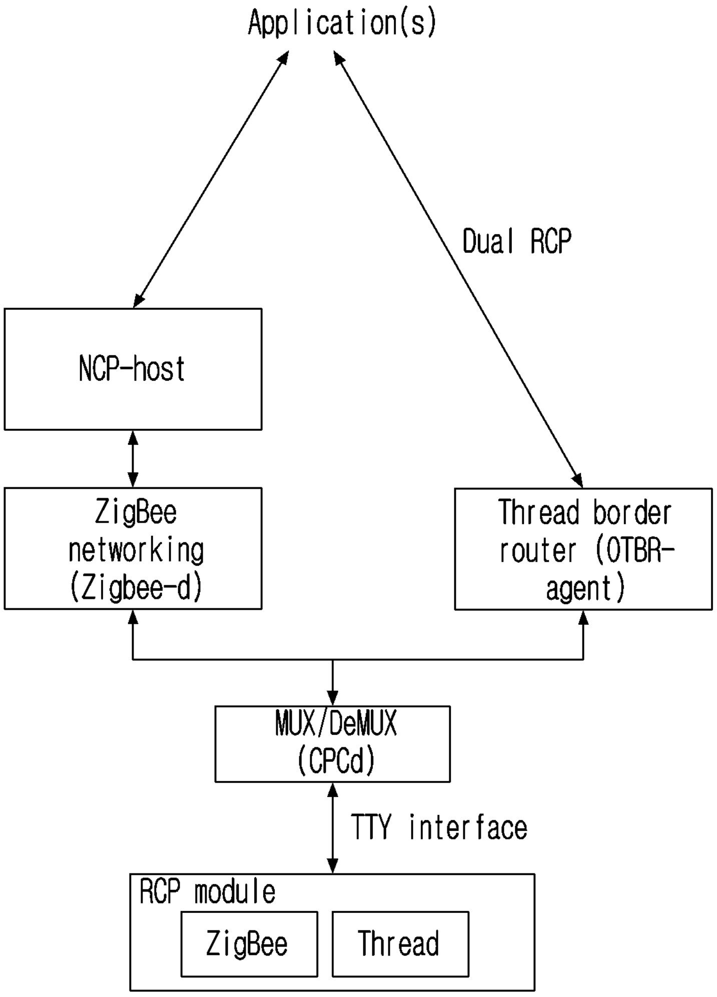
FIG. 5A depicts an implementation of a radio co-processor (RCP) module and associated modules and layers according to an embodiment of the disclosure herein.
Figure 5B:
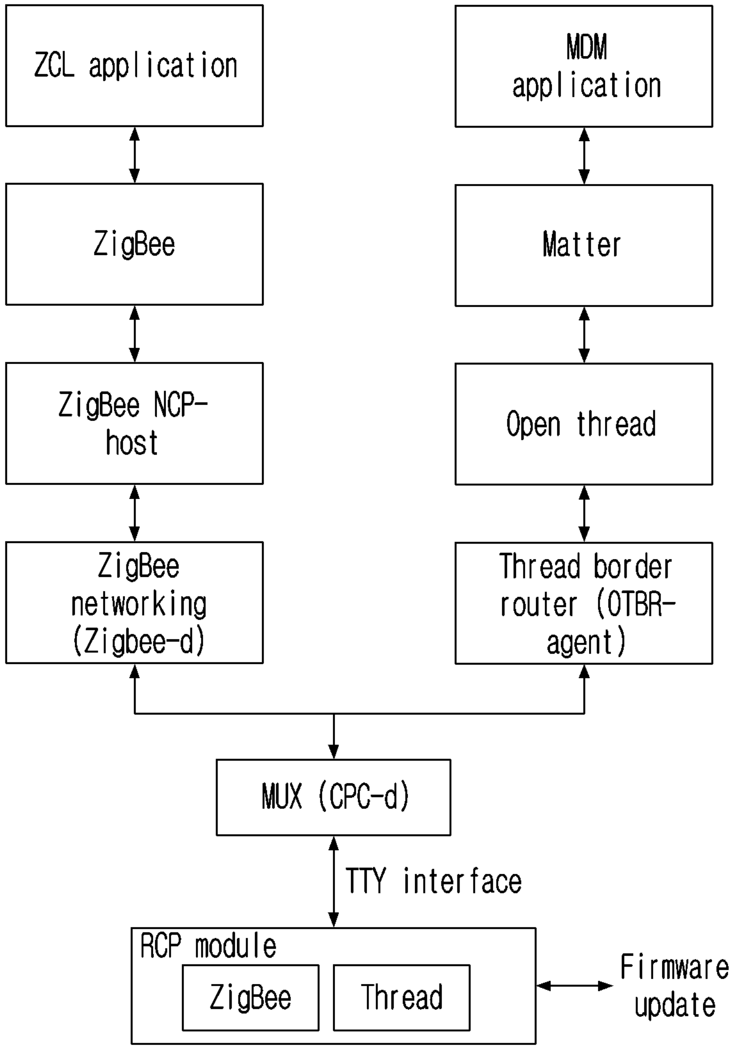
FIG. 5B depicts an implementation of an RCP module and associated modules and layers according to an embodiment of the disclosure.
Figure 5C:
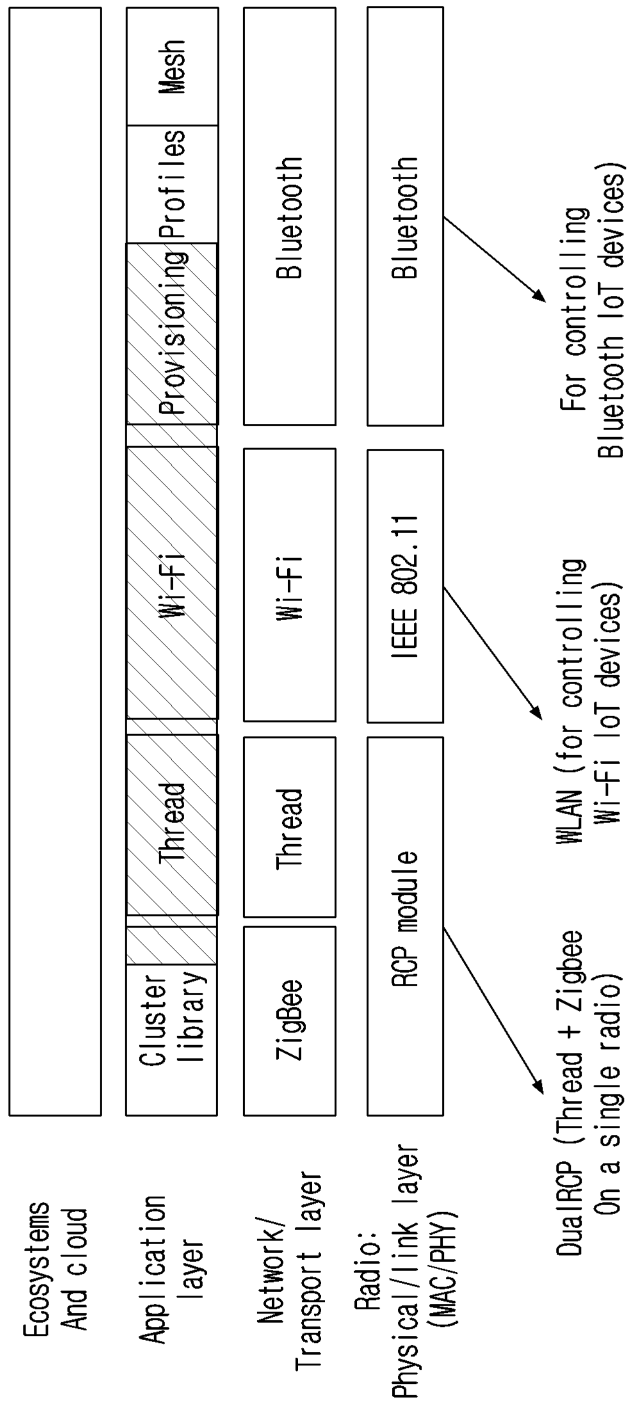
FIG. 5C depicts an implementation of a RCP module and associated modules and layers according to an embodiment of the disclosure.

FIGS. 5A, 5B, and 5C depict an implementation of an RCP module and the associated modules and layers according to various embodiments of the disclosure.

Referring to FIGS. 5A, 5B, and 5C, the RCP module 106 can use ZigBee and Thread on a single chip. Consider that the RCP module 106 is transmitting a message. The RCP module 106 can provide the message to be transmitted to a mux/de-mux module 402, 403 through a TTY interface. The mux/de-mux module 402, 403 can multiplex the message (i.e., CPC the message) and provide the message to the respective application. If the message is to be transmitted using ZigBee, the message is provided to a ZigBee networking module and a NCP-host, which further communicates the message to a hub device. If the message is to be transmitted using Thread, the message is provided to a Thread border router, which further communicates the message to the hub device.

Consider that the device 100 is receiving a message. The hub device can receive the message. If the message is received over Thread, the hub device can send the message to the Thread border router. The Thread border router routes the message to the mux/de-mux module 402, 403, which de-multiplexes the message and provides the message to the RCP module 106. If the message is received over ZigBee, the hub device can send the message to the ZigBee networking module and the NCP-host. The ZigBee networking module routes the message to the mux/de-mux module 402, 403, which de-multiplexes the message and provides the message to the RCP module 106.

Figure 6A:
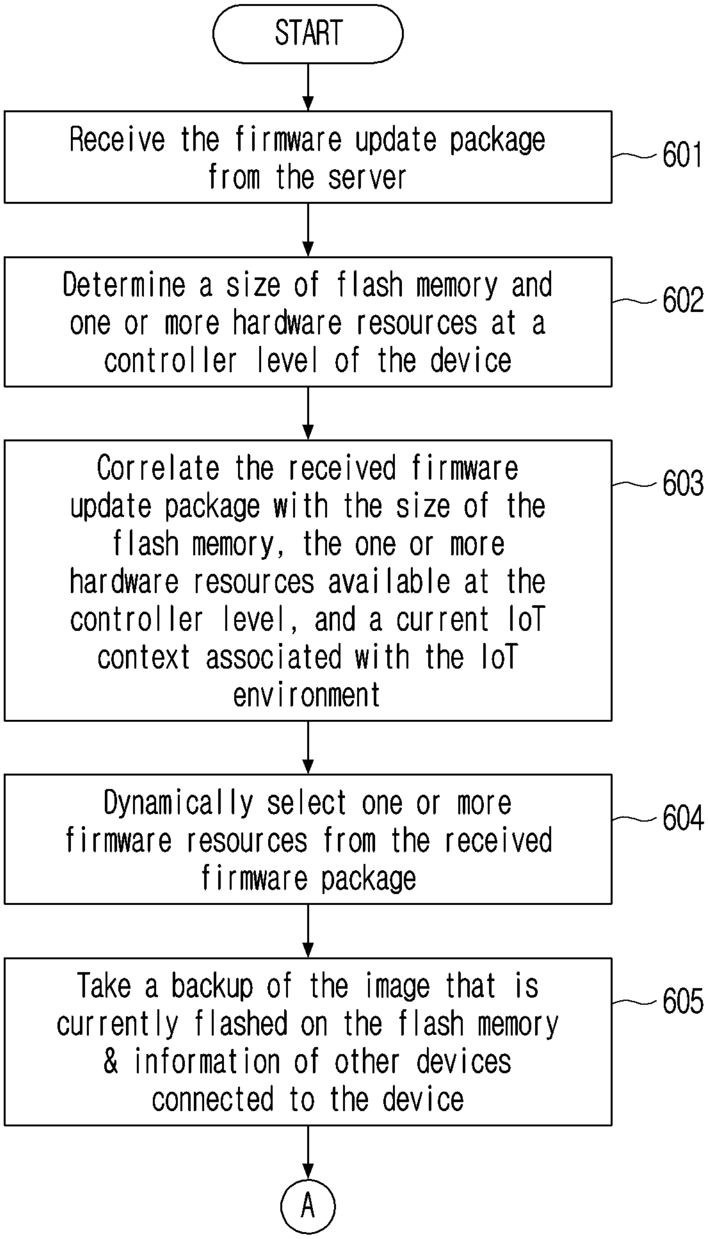
FIG. 6A illustrates flowcharts depicting a process for dynamically updating firmware of a single-protocol based one-chip radio device present in an Internet of things (IoT) environment according to an embodiment of the disclosure.
Figure 6B:
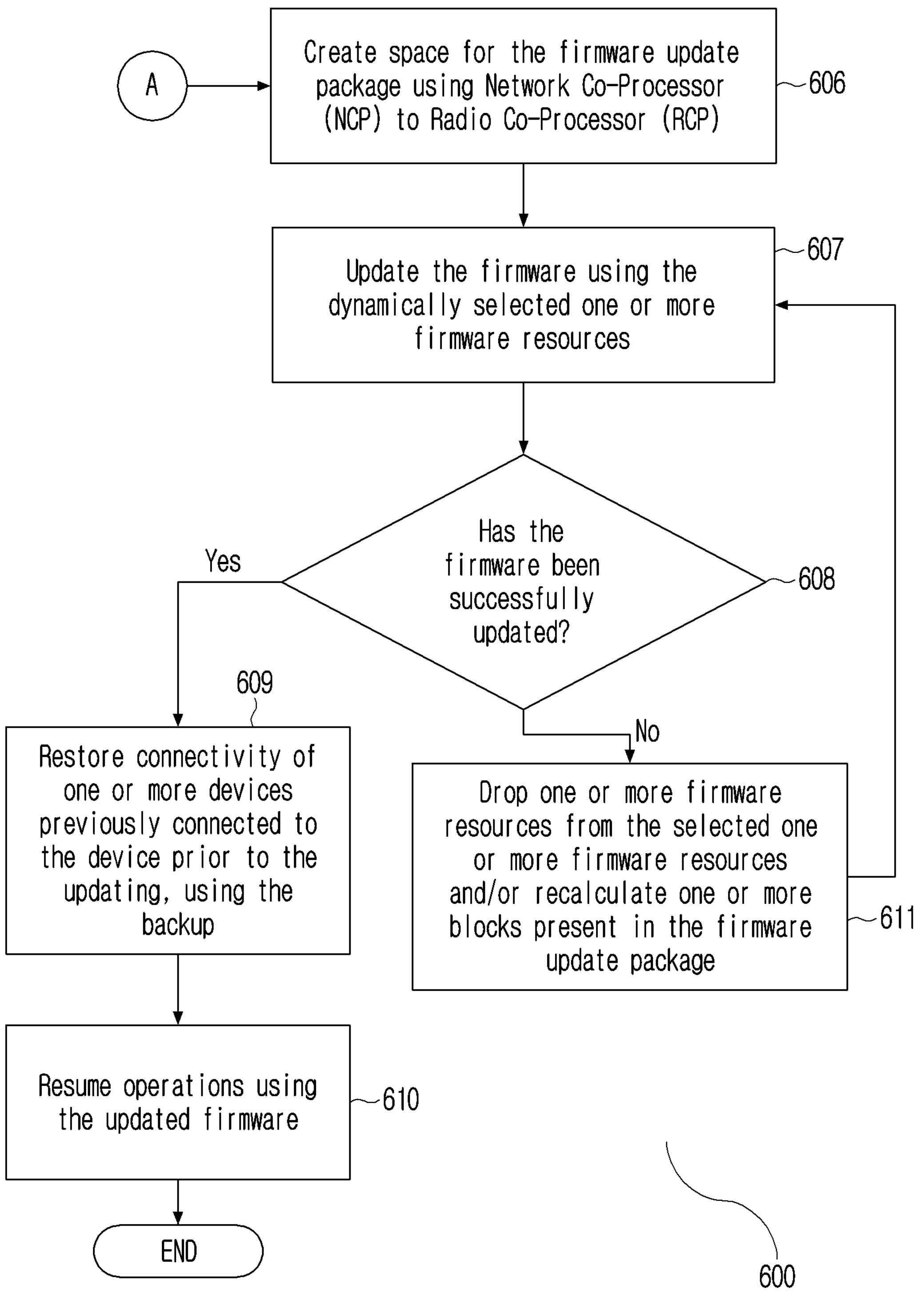
FIG. 6B illustrates flowcharts depicting a process for dynamically updating firmware of a single-protocol based one-chip radio device present in an Internet of things (IoT) environment according to an embodiment of the disclosure.

FIGS. 6A and 6B are flowcharts depicting a process for dynamically updating firmware of a single-protocol based one-chip radio device present in an Internet of things (IoT) environment according to various embodiments of the disclosure.

Referring to FIGS. 6A and 6B, in operation 601, the device 100 receives the firmware update package from the server 107. The firmware update package includes one or more firmware resources associated with one or more connectivity protocols. On receiving the firmware update package, in operation 602, the device 100 determines a size of flash memory and one or more hardware resources at a controller level of the device 100.

In operation 603, the device 100 correlates the received firmware update package with the size of the flash memory, the one or more hardware resources available at the controller level, and a current IoT context associated with the IoT environment.

In operation 604, the device 100 dynamically selects one or more firmware resources from the received firmware package for updating firmware of the device 100, based on the correlation. The device 100 dynamically selects the one or more firmware resources is based on at least one of hardware/radio availability, usage of devices in the IoT environment and location and behavior of the devices in the IoT environment, geo-location of the single-protocol based one-chip radio device, application load on the device 100, firmware resources, priority of the devices in the IoT environment, user preference, or user selection.

In operation 605, the device 100 takes a backup of the image that is currently flashed on the flash memory 104 to the memory 105, and a backup of other devices connection information (such as, but not limited to, extended unique identifier (EUI) (media access control (MAC) address), configurations, and so on) to the device 100 to the memory 105.

In operation 606, the device 100 creates space for the firmware update package using network co-processor (NCP) to radio co-processor (RCP).

In operation 607, the device 100 updates its firmware using the dynamically selected one or more firmware resources and activates the updated firmware. If the device 100 has successfully updated the firmware in operation 608, in operation 609, the device 100 restores connectivity of one or more devices previously connected to the device 100 prior to the updating, using the backup and in operation 610, the device resumes operations with the updated firmware. If there is a failure when updating the firmware in operation 608, in operation 611, the device 100 drops one or more firmware resources from the selected one or more firmware resources and/or recalculates one or more blocks present in the firmware update package, before attempting to flash the firmware again. The various actions in method 600 may be performed in the order presented, in a different order or simultaneously. Further, in some embodiments of the disclosure, some actions listed in FIGS. 6A and 6B may be omitted.

In an example, consider that a user has a mobile phone (i.e., the device 100). Consider that inside his home, the user can use his mobile phone to device-to-device (D2D) control IoT devices using Zigbee/Thread and outside his home, the user wants to listen to music over BLE. On determining that the user is at home, embodiments herein will dynamically download the Zigbee & Thread firmware to a single chip and will turn the device to IoT Control mode. Further, on determining that the user is outside his home, embodiments herein will dynamically download the BLE firmware on a single chip and will turn the device in to BLE mode for BLE audio streaming.

In an example scenario, consider that the device 100 is a device with Zigbee. The hardware resources available in the device 100 are depicted in Table 8.

TABLE 8

| Total flash | Flash utilized | Flash available | Channel range | Boot loader | NCP/RCP | Priority |
|---|---|---|---|---|---|---|
| 512 KB | 220 KB | 292 KB | 1-16 | Yes | NCP | 1 |

The user of the device uses ZigBee indoors for IoT (as depicted in Table 9), and UWB and BLE outdoors for tracking the user activity (as depicted in Table 10). Consider that the user with their device is currently indoors; i.e., Table 9 is considered to be a current metadata.

TABLE 9

| Technology | Size (KB) | Meta Data |
|---|---|---|
| Zigbee | 110 | ROM 120 KB, SecKey, CH 11, Free Mem |

TABLE 10

| Technology | Size (KB) | Meta Data |
|---|---|---|
| BLE | 110 | RAM 170 KB, Sec Key, CH 5 |

The manufacturer of the device 100 pushes a new firmware (as depicted in Tables 11 & 12) to the device 100. The device 100 downloads the firmware and stored the downloaded firmware in the memory.

TABLE 11

| Metadata | BLE (50 KB) | Zigbee (110 KB) | Thread (230 KB) |
|---|---|---|---|

TABLE 12

| Technology | ROM (KB) | CRC signing | Block Addr | Channel No | Boot loader | Priority |
|---|---|---|---|---|---|---|
| Zigbee | 110 KB | 0xAD124FB1 | 0x117732 | 11 | Yes | 1 |
| Thread | 203 KB | 0xF3D12A32 | 0x1286af | 11 | No | 2 |
| BLE | 50 KB | 0x165F234A | 0x148acd | 3 | Yes | 3 |
| UWB | 170 KB | 0x76A5CD21 | 0x3483FA | 13 | No | 4 |
| LoRa | 110 KB | 0x43A2C87 | 0x36AD23 | 3 | No | 5 |

The device 100 obtains the current metadata (Table 9) and hardware resources on the RCP module 106 and determines which technologies are supported by the hardware (Table 8). The device 100 can dynamically generate various use cases based on the user context (such as, but not limited to, present location of the user: indoors or outdoors). The device 100 can correlate and determine which user inputs are to be accepted for technologies to support. Consider that the user has moved outdoors, wherein the user context can be as depicted in Table 10. Accordingly, the device 100 can prepare a firmware package comprising of BLE. The device 100 can backup sensor data (i.e., devices already connected to the device 100) in the form of a table (Table 13) for later restoration.

In an example use case, if a portable hub is inside the home, the portable hub can act as an IoT controller for Zigbee and Thread devices. If the portable hub outside the home and the user is travelling with it, the portable hub can act as a BT location tracker or a BLE audio streaming device. When the user reaches their office, the portable hub can act as a Zigbee only controller hub (based on the available Zigbee only devices).

TABLE 13

| Devices | DNI | EUI |
|---|---|---|
| Zigbee Blub | 0x351B | 0x13FB5C |
| Zigbee Outlet | 0c561A | 0x32FFCA |

The device 100 can update the firmware on the RCP module 106 with the corresponding firmware. On successful updation of the firmware, the device 100 can restore the connected devices using the previously taken backup (Table 13).

In an example scenario, consider that the device 100 is a hub device. The hardware resources available in the device 100 are depicted in Table 14.

TABLE 14

| Total flash | Flash utilized | Flash available | Channel range | Boot loader | NCP/RCP | Priority |
|---|---|---|---|---|---|---|
| 512 KB | 220 KB | 292 KB | 1-16 | Yes | NCP | 1 |

The manufacturer of the device 100 pushes a new firmware (as depicted in Tables 15 & 16) to the device 100. The device 100 downloads the firmware and stored the downloaded firmware in the memory.

TABLE 15

| Metadata | BLE (50 KB) | Zigbee (110 KB) | Thread (230 KB) |
|---|---|---|---|

TABLE 16

| Technology | ROM (KB) | CRC signing | Block Addr | Channel No | Boot loader | Priority |
|---|---|---|---|---|---|---|
| Zigbee | 110 KB | 0xAD124FB1 | 0x117732 | 11 | Yes | 1 |
| Thread | 203 KB | 0xF3D12A32 | 0x1286af | 11 | No | 2 |
| BLE | 50 KB | 0x165F234A | 0x148acd | 3 | Yes | 3 |
| UWB | 170 KB | 0x76A5CD21 | 0x3483FA | 13 | No | 4 |
| LoRa | 110 KB | 0x43A2C87 | 0x36AD23 | 3 | No | 5 |

The device 100 obtains the current metadata (table 17) and hardware resources on the RCP module 106 and determines which technologies are supported by the hardware (table 14).

TABLE 17

| Technology | Size (KB) | Meta Data |
|---|---|---|
| Zigbee | 110 | ROM 120 KB, SecKey, CH 11, Free Mem |

A Cloud triggers the device 100 to perform a firmware update for at least one technology (which can be with or without that technology being present); i.e., thread in the current example. The device 100 can check for feasibility of Thread being supported based on the correlation or input from the cloud, which can be based on the metadata (firmware and on radio) and the hardware resources. The metadata may be included in the firmware. Accordingly, the device 100 can prepare a firmware package comprising of ZigBee and Thread (as depicted in Table 18).

TABLE 18

| Technology | Size (KB) | Meta Data |
|---|---|---|
| Zigbee | 110 | RAM 120 KB, Sec Key, CH 1 |
| Thread | 230 | RAM 170 KB, Sec Key, CH 7 |

The device 100 can backup sensor data (i.e., devices already connected to the device 100) in the form of a table (Table 19) for later restoration.

TABLE 19

| Devices | DNI | EUI |
|---|---|---|
| Zigbee Blub | 0x351B | 0x13FB5C |
| Zigbee Outlet | 0c561A | 0x32FFCA |

Figure 7:
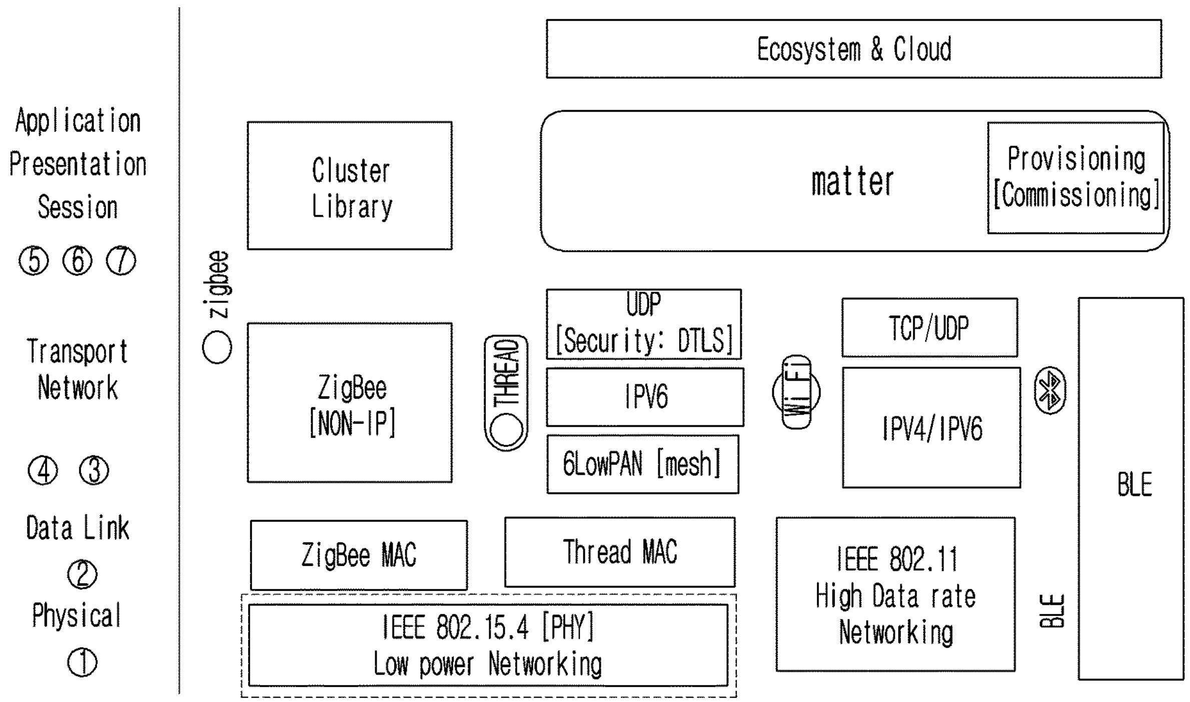
FIG. 7 depicts a device configured with ZigBee and Thread according to an embodiment of the disclosure.

The device 100 can update the firmware on the RCP module 106 with the corresponding firmware (comprising of ZigBee and Thread) (as depicted in FIG. 7). On successful updation of the firmware, the device 100 can restore the connected devices using the previously taken backup (table 19).

FIG. 7 depicts a device configured with ZigBee and Thread according to an embodiment of the disclosure.

Referring to FIG. 7, in an example scenario, consider that a user purchases a television (TV) with built in hub capability, and now, the user has three hubs, hub 1, hub 2 and hub 3 (i.e., the TV) in his home. If hubs 1 and 2 support Zigbee and Wi-Fi matter respectively, the firmware of the TV (that has been recently added to the IoT environment) can be upgraded to support BLE & Thread (which was not previously supported by the other hubs in the IoT environment). This enables all the devices to be connected to at least one hub, as seen in Table 20, without hubs in the IoT environment having to support duplicate technologies at the same location.

TABLE 20

| S/N | Device | Protocol | Connected Hub |
|---|---|---|---|
| 1 | Bulb | Zigbee | Hub 1 |
| 2 | Motion Sensor | Zigbee | Hub 1 |
| 3 | AC | Wi-Fi matter | Hub 2 |
| 4 | Table Fan | BLE | Hub 3 |
| 5 | Door lock | Thread | Hub 3 |

In an example scenario, consider that the user has a hub 1 and a hub 2 in their living room, which supports ZigBee, BLE and Thread. Table 21 depicts the connected devices, device types, the hub to which each device is connected, the respective distance from the hub, and their respective usage times.

TABLE 21

| Device | Device Type | Hub | Distance from Hub | Usage Time |
|---|---|---|---|---|
| Motion Sensor | Zigbee | Hub 1 | 10M | Day [6 AM-6 PM] |
| Water pump | BLE | Hub 1 | 3M | Day [6 AM-6 PM] |
| Blub/Light | Zigbee | Hub 2 | 5M | Night [6 PM-6 AM] |
| AC | Thread | Hub 2 | 2M | Night [6 PM-6 AM] |

It can be seen that specific devices are controlled by the same static hubs irrespective of the distance from the hubs. However, the distance between hubs and devices (if more) can sometimes effect the operations of the devices. Based on the day time context, embodiments herein can dynamically perform firmware update and change the protocol behavior. The distance between the devices and hubs can be used to make sure that devices are in range and the same location. For example, the motion sensor and the water pump are not used at Night and it is near to hub 1, the bulb/AC are used only used at night and near to hub 2, and both the hubs are in the same location; (i.e., the living room). Embodiments herein can update hub 1 with protocols used by hub 2 (i.e., ZigBee and Thread). This can be done based on the usage time, device location and behavior.

Continuing the example, consider that hub 1 supports ZigBee and BLE in the day time (6 AM-6 PM) and hub 2 is not available in the night (from 6 PM-6 AM), so, hub 1 is upgraded with ZigBee and Thread for the night, so that the hub 1 can support the devices previously connected to hub 2. Table 22 shows the connectivity of the devices in IoT environment in the night time.

TABLE 22

| Device | Device Type | Hub | Distance from Hub | Usage Time |
|---|---|---|---|---|
| Motion Sensor | Zigbee | Hub 1 | 10M | Day [6 AM-6 PM] |
| Water pump | BLE | Hub 1 | 3M | Day [6 AM-6 PM] |
| Blub/Light | Zigbee | Hub 1 | 5M | Night [6 PM-6 AM] |
| AC | Thread | Hub 1 | 2M | Night [6 PM-6 AM] |

In an example scenario, consider that a portable device 1 (a wireless charger) and a portable device 2 (a tablet) serve as hubs in an IoT environment. A user can use the portable devices as hubs while in their home or in office or in transit for controlling various devices. The devices may have limited resources to support simultaneous multiple protocols. So, when the user is at home, the user needs to control home IoT devices (such as Zigbee & Thread devices); so, the device 1 is updated with Zigbee & Thread firmware. When user is in transit, there are no IoT home devices to control; however, the user needs to stream BLE music and track his assets using a tracking device (such as a tag). Hence, the firmware of device 1 is dynamically updated with BLE only. When user is at his office, there are only Zigbee sensor devices. Hence, the firmware of device 1 is dynamically updated with Zigbee only.

In an example scenario, consider that a user is using a TV (as a hub), wherein during normal operation an optimal resource utilization, the TV supports ZigBee and Thread. If the user wants to run Netflix with 8K Content, then the hub functionality may stop working or Netflix may not run due to memory issues. In such scenarios, based on the application CPU load, free memory, embodiments herein can optimize resources by upgrading the firmware of the TV, so as to retain support for ZigBee and remove Thread support.

During runtime, if the device 100 observes coexistence issues between Wi-Fi 2.4 GHz and BLE, then using embodiments as disclosed herein, the device 100 can temporarily update the firmware without BLE.

In an example scenario, consider that the cost of a single 802.15.4 PHY radio BOM cost is $X per device. If a device has to support Zigbee, Thread, WLAN, BLE, then 4 separate 802.15.4 PHY radios are needed. Using embodiments as disclosed herein, all the four technologies can be supported using single radio. For example, if four technologies are supported in a single chip, embodiments herein enable savings of around ~$(X*(4-1)) per device (i.e., a savings of about 75%).

Further, if the device is using 4 separate radio PHYs, the power consumption will be more. For example, one radio PHY takes 250 Milli amps, 4 separate radio chip consumes 1 Amps, whereas when using a single radio PHY, the power consumption remains ~250 milli amps only.

Multiple radio PHYs also require multiple antennas, which need to be arranged in such a way that it should not have inference with each other. Additionally, a co-existence circuit is also needed to make sure that multiple radio chipsets should not send packets over air at same time, in order to avoid air packet collision (packet traffic arbitration), which is not a scenario that will occur in a device with a single radio PHY.

The embodiments disclosed herein can be implemented through at least one software program running on at least one hardware device and performing network management functions to control the network elements. The elements shown in the figures include blocks which can be at least one of a hardware device, or a combination of hardware device and software module.

The embodiment disclosed herein describes methods and systems for dynamically updating firmware of a single-protocol based one-chip radio device present in an Internet of things (IoT) environment with multiple technologies using an intelligent firmware update. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g., very high speed integrated circuit hardware description language (VHDL) another programming language, or implemented by one or more VHDL or several software modules being executed on at least one hardware device. The hardware device can be any kind of portable device that can be programmed. The device may also include means which could be e.g., hardware means like e.g., an application-specific integrated circuit (ASIC), or a combination of hardware and software means, e.g., an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, e.g., using a plurality of CPUs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for dynamically updating firmware of a single-protocol based one-chip radio device present in an Internet of things (IoT) environment, the method comprising:

receiving a firmware update package, wherein the firmware update package includes one or more firmware resources associated with one or more connectivity protocols;

determining a size of a flash memory of the single-protocol based one-chip radio device and one or more hardware resources available at a controller level of the single-protocol based one-chip radio device, based on receiving the firmware update package;

correlating the received firmware update package with the size of the flash memory of the single-protocol based one-chip radio device, the one or more hardware resources available at the controller level of the single-protocol based one-chip radio device, and a current IoT context associated with the IoT environment;

dynamically selecting one or more firmware resources from the received firmware update package for dynamically updating firmware of the single-protocol based one-chip radio device based on the correlation; and dynamically updating firmware of the single-protocol based one-chip radio device with multiple protocols using the dynamically selected one or more firmware resources and activating the dynamically updated firmware of the single-protocol based one-chip radio device.

2. The method of claim 1, wherein the dynamically selecting of the one or more firmware resources is based on at least one of hardware/radio availability, usage of devices in the IoT environment and location and behavior of the devices in the IoT environment, geo-location of the single-protocol based one-chip radio device, application load on the single-protocol based one-chip radio device, firmware resources, priority of the devices in the IoT environment, user preference, or user selection.

3. The method of claim 1, further comprising:

creating space for the received firmware update package using network co-processor (NCP) to radio co-processor (RCP).

4. The method of claim 1, further comprising:

taking a backup of one or more devices connected to the single-protocol based one-chip radio device.

5. The method of claim 4, wherein the dynamically updating of the firmware of the single-protocol based one-chip radio device with the multiple protocols further comprises restoring connectivity of the one or more devices previously connected to the single-protocol based one-chip radio device prior to the dynamically updating of the firmware of the single-protocol based one-chip radio device, using the backup of the one or more devices.

6. The method of claim 1, further comprising:

dropping one or more firmware resources from the dynamically selected one or more firmware resources, based on a failure occurring according to the dynamically updating of the firmware of the single-protocol based one-chip radio device.

7. The method of claim 1, wherein the one or more connectivity protocols include at least one of Zigbee, Thread, or Bluetooth Low Energy (BLE).

8. The method of claim 1, wherein the one or more hardware resources include radio, channel range, and network co-processor/radio co-processor (NCP/RCP) at the controller level of the single-protocol based one-chip radio device.

9. The method of claim 1, further comprising:
flashing the dynamically selected one or more firmware resources into the flash memory of the single-protocol based one-chip radio device.

10. The method of claim 9,
wherein the dynamically selected one or more firmware resources is a first resource information, and
wherein the method further comprises, based on failure of the flashing being detected:
recalculating one or more blocks present in the firmware update package,
obtaining a second resource information by dropping one or more firmware resources from the dynamically selected one or more firmware resources,
re-flashing the second resource information into the flash memory of the single-protocol based one-chip radio device, and
dynamically updating the firmware of the single-protocol based one-chip radio device using the second resource information.

11. A single-protocol based one-chip radio device present in an Internet of things (IoT) environment, the single-protocol based one-chip radio device comprising:
a memory;
a firmware control module coupled with the memory; and
one or more processors configured to be electrically connected to the firmware control module and the memory,
wherein the memory stores one or more computer programs including computer-executable instructions that, when executed by the one or more processors individually or collectively, cause the single-protocol based one-chip radio device to:
receive a firmware update package, wherein the firmware update package includes one or more firmware resources associated with one or more connectivity protocols;
determine a size of a flash memory of the single-protocol based one-chip radio device and one or more hardware resources available at a controller level of the single-protocol based one-chip radio device, based on receiving the firmware update package;
correlate the received firmware update package with the size of the flash memory of the single-protocol based one-chip radio device, the one or more hardware resources available at the controller level of the single-protocol based one-chip radio device, and a current IoT context associated with the IoT environment;
dynamically select one or more firmware resources from the received firmware update package for dynamically updating firmware of the single-protocol based one-chip radio device based on the correlation; and
dynamically update firmware of the single-protocol based one-chip radio device with multiple protocols using the dynamically selected one or more firmware resources and activate the dynamically updated firmware of the single-protocol based one-chip radio device.

12. The single-protocol based one-chip radio device of claim 11, wherein the one or more computer programs further comprise computer-executable instructions that, when executed by the one or more processors individually or collectively, cause the single-protocol based one-chip radio device to:
dynamically select one or more firmware resources based on at least one of hardware/radio availability, usage of devices in the IoT environment and location and behavior of the devices in the IoT environment, geo-location of the single-protocol based one-chip radio device, application load on the single-protocol based one-chip radio device, firmware resources, priority of the devices in the IoT environment, user preference, or user selection.

13. The single-protocol based one-chip radio device of claim 11, wherein the one or more computer programs further comprise computer-executable instructions that, when executed by the one or more processors individually or collectively, cause the single-protocol based one-chip radio device to:
create space for the received firmware update package using network co-processor (NCP) to radio co-processor (RCP).

14. The single-protocol based one-chip radio device of claim 11, wherein the one or more computer programs further comprise computer-executable instructions that, when executed by the one or more processors individually or collectively, cause the single-protocol based one-chip radio device to:
take a backup of one or more devices connected to the single-protocol based one-chip radio device.

15. The single-protocol based one-chip radio device of claim 14, wherein the one or more computer programs further comprise computer-executable instructions that, when executed by the one or more processors individually or collectively, cause the single-protocol based one-chip radio device to:
restore connectivity of the one or more devices previously connected to the single-protocol based one-chip radio device prior to the dynamically updating of the firmware of the single-protocol based one-chip radio device, using the backup of the one or more devices.

16. The single-protocol based one-chip radio device of claim 11, wherein the one or more computer programs further comprise computer-executable instructions that, when executed by the one or more processors individually or collectively, cause the single-protocol based one-chip radio device to:
drop one or more firmware resources from the dynamically selected one or more firmware resources, based on a failure occurring according to the dynamically updating of the firmware of the single-protocol based one-chip radio device.

17. The single-protocol based one-chip radio device of claim 11, wherein the one or more connectivity protocols include at least one of Zigbee, Thread, or Bluetooth Low Energy (BLE).

18. The single-protocol based one-chip radio device of claim 11, wherein the one or more hardware resources include radio, channel range, and network co-processor/radio co-processor (NCP/RCP) at the controller level of the single-protocol based one-chip radio device.

19. One or more non-transitory computer-readable storage media storing computer-executable instructions that, when executed by one or more processors of a single-protocol based one-chip radio device present in an Internet of things (IoT) environment individually or collectively, cause the single-protocol based one-chip radio device to perform operations, the operations comprising:

receiving a firmware update package, wherein the firmware update package includes one or more firmware resources associated with one or more connectivity protocols;

determining a size of a flash memory of the single-protocol based one-chip radio device and one or more hardware resources available at a controller level of the single-protocol based one-chip radio device, based on receiving the firmware update package;

correlating the received firmware update package with the size of the flash memory of the single-protocol based one-chip radio device, the one or more hardware resources available at the controller level of the single-protocol based one-chip radio device, and a current IoT context associated with the IoT environment;

dynamically selecting one or more firmware resources from the received firmware update package for dynamically updating firmware of the single-protocol based one-chip radio device based on the correlation; and dynamically updating firmware of the single-protocol based one-chip radio device with multiple protocols using the dynamically selected one or more firmware resources and activating the dynamically updated firmware of the single-protocol based one-chip radio device.

20. The one or more non-transitory computer-readable storage media of claim 19, wherein the dynamically selecting of the one or more firmware resources is based on at least one of hardware/radio availability, usage of devices in the IoT environment and location and behavior of the devices in the IoT environment, geo-location of the single-protocol based one-chip radio device, application load on the single-protocol based one-chip radio device, firmware resources, priority of the devices in the IoT environment, user preference, or user selection.

* * * * *